(12) United States Patent
Tonegawa et al.

(10) Patent No.: US 7,994,908 B2
(45) Date of Patent: Aug. 9, 2011

(54) VEHICLE AND INFORMATION APPARATUS OF VEHICLE

(75) Inventors: Hiromi Tonegawa, Kounan (JP); Masato Ichishi, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 348 days.

(21) Appl. No.: 12/224,547

(22) PCT Filed: Feb. 23, 2007

(86) PCT No.: PCT/JP2007/053993
§ 371 (c)(1),
(2), (4) Date: Aug. 29, 2008

(87) PCT Pub. No.: WO2007/100073
PCT Pub. Date: Sep. 7, 2007

(65) Prior Publication Data
US 2009/0184833 A1    Jul. 23, 2009

(30) Foreign Application Priority Data

Mar. 3, 2006    (JP) .................................. 2006-058394

(51) Int. Cl.
*G08B 1/08* (2006.01)
*H04M 11/04* (2006.01)
*H04Q 1/30* (2006.01)
*G08G 1/123* (2006.01)
*B60L 1/00* (2006.01)
*H02G 3/00* (2006.01)
*G06F 9/44* (2006.01)
*G06F 7/00* (2006.01)

(52) U.S. Cl. .............. 340/538; 340/995.12; 340/995.18; 307/10.1; 717/173; 707/782

(58) Field of Classification Search ..... 340/538–538.17, 340/988–996; 307/3–10.1; 707/769–780, 707/781–788; 717/168–173
See application file for complete search history.

(56) References Cited

U.S. PATENT DOCUMENTS

| | | | | |
|---|---|---|---|---|
| 5,572,204 | A | * | 11/1996 | Timm et al. .................... 340/988 |
| 5,596,258 | A | * | 1/1997 | Kimura et al. ................. 320/163 |
| 2003/0045946 | A1 | * | 3/2003 | Hattori et al. .................... 700/27 |
| 2004/0039951 | A1 | | 2/2004 | Naitou et al. |
| 2007/0198176 | A1 | * | 8/2007 | Endo et al. ..................... 701/208 |

FOREIGN PATENT DOCUMENTS

| | | |
|---|---|---|
| JP | A-11-027749 | 1/1999 |
| JP | A-2001-008380 | 1/2001 |
| JP | A-2001-258177 | 9/2001 |
| JP | A-2002-271248 | 9/2002 |
| JP | A-2003-274386 | 9/2003 |
| JP | A-2004-131054 | 4/2004 |
| JP | A-2004-157909 | 6/2004 |
| JP | A-2004-222176 | 8/2004 |

\* cited by examiner

*Primary Examiner* — Benjamin C Lee
*Assistant Examiner* — Michael Shannon
(74) *Attorney, Agent, or Firm* — Oliff & Berridge, PLC.

(57) ABSTRACT

An information apparatus of a vehicle that allows the request for the required information to be reliably made is provided. When a vehicle and a charging device are connected to each other for transmission and reception of electric power in order to charge a main battery, a main control ECU receives the contents from a server depending on the contents requesting information stored in a request storing unit and stores the received contents in a contents storing unit. Preferably, prior to receiving the contents, the main control ECU notifies of the content of the contents requesting information to inquire of an operator performing the charging whether the contents are received based on the contents requesting information.

12 Claims, 4 Drawing Sheets

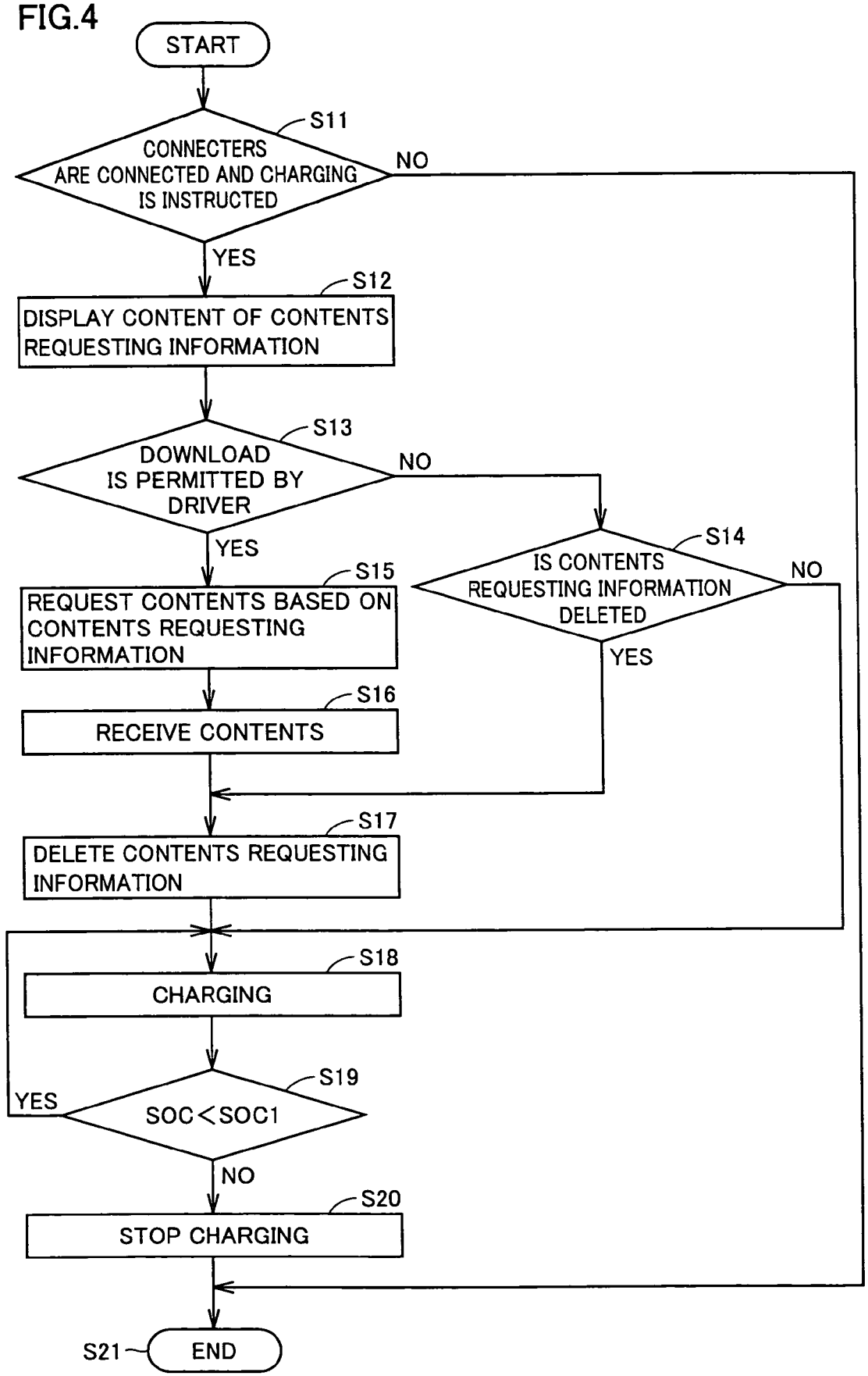

VEHICLE AND INFORMATION APPARATUS
OF VEHICLE

TECHNICAL FIELD

The present invention relates to a vehicle and an information apparatus thereof, and particularly to a vehicle and an information apparatus thereof having a device capable of transmitting and receiving electric power to and from an external device.

BACKGROUND ART

As an environmentally-friendly vehicle, an electric vehicle, a hybrid vehicle, a fuel cell vehicle, and the like incorporating a power storage device and also incorporating a motor as a driving device have attracted attention in recent years. It is also considered that the hybrid vehicle is configured to be rechargeable from the outside.

Japanese Patent Laying-Open No. 2004-222176 discloses a communication system in which a first communication system unit provided on the electric vehicle side and a second communication system unit provided on the electric power supply side supplying electric power for charging the electric vehicle communicate with each other through an electric power supply line for supplying electric power for charging the electric vehicle from the electric power supply side.

An example of information required on the vehicle side includes a road map of the car navigation system, music information, and the like, which are often required during vehicle running.

In order to receive data in real time during vehicle running, it is considered that, for example, the wireless communication is performed between the distribution center storing the information and the vehicle. However, the wireless communication greatly depends on the conditions of the communication infrastructure and also involves various constraints.

However, in the method of receiving the information distribution through the electric power supply line during the charging of the vehicle as disclosed in Japanese Patent Laying-Open No. 2004-222176, all of the operations should be carried out during the charging. For example, the driver may forget at the time of the charging which area in the road map is required, and the input operation during the charging may be complicated.

DISCLOSURE OF THE INVENTION

An object of the present invention is to provide a vehicle and an information apparatus of the vehicle that allow the information with its possible necessity being suggested to be reliably requested.

In summary, the present invention provides a vehicle having an apparatus using information and having an electric power transmitting and receiving device transmitting and receiving electric power to and from an external device external to the vehicle. The vehicle includes a first storage unit storing data related to the information used in the apparatus in the state where the external device and the vehicle are not connected to each other; a second storage unit storing the information; detecting means for detecting a connected state of the vehicle to a charging device; and control means for, when the detecting means detect the connected state, obtaining the information to store in the second storage unit from outside the vehicle based on the related data stored in the first storage unit.

Preferably, the control unit notifies of a content of the related data prior to receiving the information to inquire of an operator connecting the vehicle and the external device whether the information is received based on the related data.

More preferably, the control unit receives the information when the result of the inquiry indicates permission of reception of the information, and further inquires whether the related data is deleted when the result of the inquiry indicates inhibition of reception of the information.

Preferably, the vehicle further includes a car navigation device. The control unit, when the state of the car navigation device satisfies a predetermined condition, inquires of an occupant of the vehicle whether to obtain the information, and, when receiving an instruction from the occupant to obtain the information, adds a request for the information as related data to the first storage unit.

Preferably, the vehicle and the external device are connected by a cable for transmitting and receiving the electric power, and the information is stored in the second storage unit through the cable.

More preferably, the related data is transmitted through the cable.

According to another aspect, the present invention provides an information apparatus of a vehicle using information and mounted in the vehicle having an electric power transmitting and receiving device transmitting and receiving electric power to and from an external device external to the vehicle. The information apparatus includes a first storage unit storing data related to the information used in the information apparatus in the state where the external device and the vehicle are not connected to each other; a second storage unit storing the information; detecting means for detecting a connected state of the vehicle to a charging device; and control means for, when the detecting means detect the connected state, obtaining the information to store in the second storage unit from outside the vehicle based on the related data stored in the first storage unit.

Preferably, the control unit notifies of a content of the related data prior to receiving the information to inquire of an operator connecting the vehicle and the external device whether the information is received based on the related data.

More preferably, the control unit receives the information when the result of the inquiry indicates permission of reception of the information, and further inquires whether the related data is deleted when the result of the inquiry indicates inhibition of reception of the information.

Preferably, the information apparatus further includes a car navigation device. The control unit, when the state of the car navigation device satisfies a predetermined condition, inquires of an occupant of the vehicle whether to obtain the information, and, when receiving an instruction from the occupant to obtain the information, adds a request for the information as related data to the first storage unit.

Preferably, the vehicle and the external device are connected by a cable for transmitting and receiving the electric power, and the information is stored in the second storage unit through the cable.

More preferably, the related data is transmitted through the cable.

According to the present invention, the information with its possible necessity being suggested during running can be requested with reliability.

BRIEF DESCRIPTION OF THE DRAWINGS

FIG. 4 is a flowchart of a processing structure of a program relating to the download of the contents executed during charging.

BEST MODES FOR CARRYING OUT THE INVENTION

Figure 1:
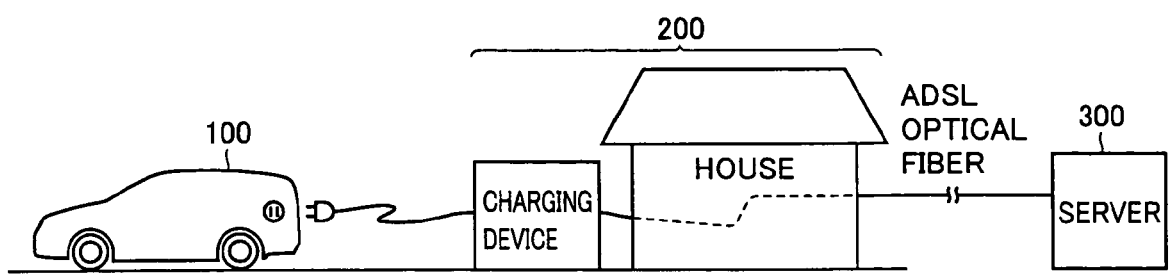
FIG. 1 is a diagram illustrating an overview of an embodiment of the present invention.

The embodiments of the present invention will be hereinafter described in detail with reference to the accompanying drawings, in which the same or corresponding components are designated by the same reference characters, and description thereof will not be repeated.

FIG. 1 is a diagram illustrating an overview of an embodiment of the present invention.

Referring to FIG. 1, a vehicle 100 incorporating a power storage device uses the electric power of the power storage device for running and has a configuration which allows the power storage device to be charged from the outside.

For example, vehicle 100 returns home where it is charged. A charging device 200 and vehicle 100 are connected to each other by a charging cable.

The vehicle obtains the required information when it is connected by the charging cable for charging. This information is used for replay, execution, interpretation, and the like on the on-vehicle apparatus and is hereinafter referred to as contents. The contents include, for example, information used in the car navigation, music data, a program of a vehicle control ECU, data used by the vehicle control ECU, and the like. The information may be obtained by the electric power line communication using the charging cable or by using the communication-dedicated line connected at the same time when the charging cable is connected.

Charging device 200 downloads the required information from an external server 300 in response to the request from the vehicle side. For example, charging device 200 and external server 300 are linked by a high-speed line, such as an ADSL (Asymmetric Digital Subscriber Line) line and an optical fiber line. Server 300 is located in the information distribution center external to the house but may be located within the house.

The communication is performed during charging, which results in an advantage that there is no possibility of a dead battery and the like in contrast to the data communication by a wireless device.

Vehicle 100, which stores the request for the contents which are felt to be necessary during running, inquires of the driver during charging whether it is intended that the contents are downloaded or not.

Figure 2:
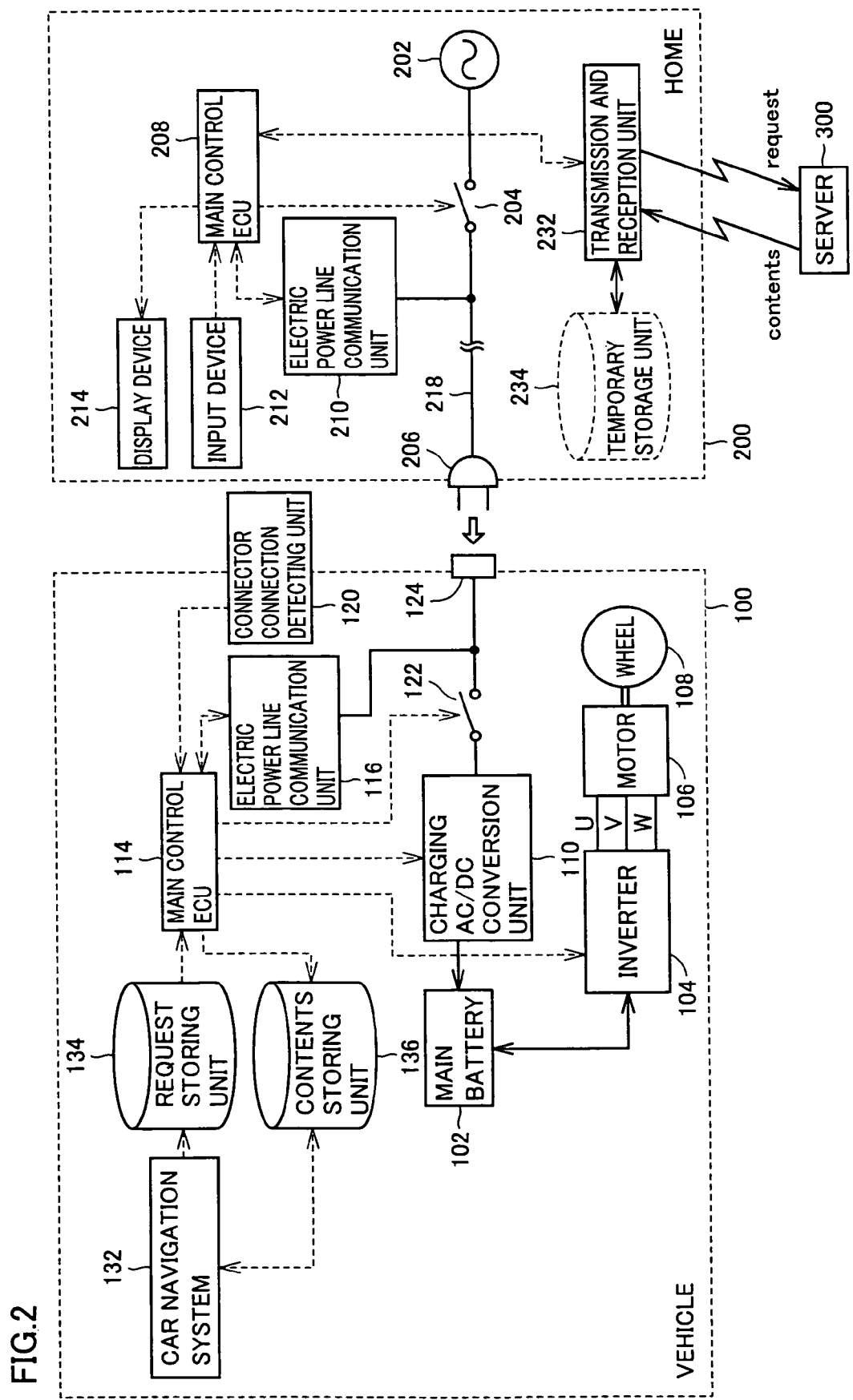
FIG. 2 is a block diagram of a configuration of a vehicle and a charging device shown in greater detail.

FIG. 2 is a block diagram of a configuration of a vehicle and a charging device shown in greater detail.

Referring to FIGS. 1 and 2, vehicle 100 includes a wheel 108, a motor 106 driving wheel 108, an inverter 104 supplying a three-phase AC (Alternating Current) power to motor 106, a main battery 102 supplying a DC (Direct Current) power to inverter 104, and a main control ECU 114 controlling inverter 104. In other words, although vehicle 100 is an electric vehicle, the present invention can also be applied to the hybrid vehicle and the like in which a motor and an engine are used in combination for driving.

Vehicle 100 has a configuration that allows main battery 102 to be charged from the outside. Vehicle 100 further includes a connector 124 provided with a terminal for feeding, for example, a commercial power supply such as AC 100V from the outside; a charging AC/DC conversion unit 110 converting the AC power supplied to connector 124 to a DC power for supplying it to main battery 102; a switch 122 connecting connector 124 and charging AC/DC conversion unit 110; a connector connection detecting unit 120 detecting that a connector 206 of charging device 200 is connected to connector 124; and an electric power line communication unit 116.

Main control ECU 114 monitors a state of charge SOC of main battery 102 and detects the connector connection by connector connection detecting unit 120. If state of charge SOC is lower than a predetermined value when connector 206 is connected to connector 124, main control ECU 114 shifts switch 122 from the opened state to the connected state and operates charging AC/DC conversion unit 110 to charge main battery 102.

Charging device 200 includes an electric power line communication unit 210 receiving, from the vehicle 100 side, information such as state of charge SOC and a request for electric power feeding; an AC power supply 202; a charging cable 218; connector 206 disposed in the end of charging cable 218; a switch 204 connecting AC power supply 202 to charging cable 218; and a main control ECU 208 controlling the opening and closing of switch 204.

When connector connection detecting unit 120 confirms the connection and main battery 102 is charged, main control ECU 114 requests charging device 200 through electric power line communication unit 116 to feed electric power, or, state of charge SOC may be transmitted from main control ECU 114 through electric power line communication unit 116 to the charging device 200 side to determine the start of electric power feeding based on state of charge SOC on the charging device 200 side.

When vehicle 100 requests charging device 200 to feed electric power, main control ECU 208 closes switch 204 to start the electric power feeding, and main control ECU 114 operates charging AC/DC conversion unit 110 to charge main battery 102.

As the charging is completed, state of charge SOC of main battery 102 becomes greater than the predetermined value. In accordance therewith, main control ECU 114 stops charging AC/DC conversion unit 110 and shifts switch 122 from the closed state to the opened state and requests charging device 200 through electric power line communication unit 116 to stop the electric power feeding. Main control ECU 208 then shifts switch 204 from the closed state to the opened state.

Vehicle 100 further includes a request storing unit 134 storing contents requesting information in the state where vehicle 100 is not connected to charging device 200 charging main battery 102 from outside the vehicle; and a contents storing unit 136 storing the contents.

Main control ECU 114 further controls transmission and reception of the contents. When vehicle 100 is connected to charging device 200 for transmission and reception of electric power in order to charge main battery 102, main control ECU 114 receives the contents from server 300 based on the contents requesting information stored in request storing unit 134 and stores the received contents in contents storing unit 136. Server 300 is located in the information distribution center external to the house but may be located within the house.

Request storing unit 134 and contents storing unit 136 correspond to first and second storage units, respectively, included in the information apparatus of the vehicle. Request storing unit 134 and contents storing unit 136 may be separate recording media or may be different regions in a single recording medium. A hard disk drive device, a flash memory, and the like can be used as the recording medium, which may also be accessed by a car navigation device.

Prior to receiving the contents, main control ECU 114 notifies of the content of the contents requesting information to inquire of an operator performing the charging whether he intends to receive the contents based on the contents requesting information.

For example, main control ECU 114, in cooperation with main control ECU 208 on the charging device side, displays the content of the contents requesting information stored in request storing unit 134 on a display device 214 to confirm whether or not it is intended that the displayed contents are downloaded from the server. The operator performing the charging inputs permission or inhibition of the reception of the contents into an input device 212. There are many cases where a certain time has passed since the contents requesting information was stored. Thus, reconfirmation is made before billing for the download cost, to thereby prevent wasteful spending for the user.

More preferably, main control ECU 114 receives the contents when the result of the inquiry indicates permission of reception of the contents, and further inquires whether the contents requesting information is deleted or not when the result of the inquiry indicates inhibition of reception of the contents. When an instruction to delete the contents requesting information is input from input device 212, main control ECU 114 deletes the contents requesting information stored in request storing unit 134.

The contents requesting information is stored in request storing unit 134 when the occupant feels it necessary while riding in the vehicle. Vehicle 100 further includes a car navigation system 132. When the state of car navigation system 132 satisfies the predetermined condition, main control ECU 114 inquires of the occupant of the vehicle whether the contents are requested or not, and when receiving the instruction from the occupant to request the contents, adds the contents requesting information to request storing unit 134.

For example, during the vehicle running in the state where the surrounding map and the vehicle location are displayed on the display by the car navigation system, the vehicle may be shown on the display as if it runs in the area with no road. In this case, there is a possibility that a newly constructed road is not shown on the map. Furthermore, in the case where the display shows that the vehicle runs at a speed far exceeding the speed limit in an urban area, a new expressway may be constructed in that area.

This is the case where the state of car navigation system 132 satisfies the predetermined condition, in which main control ECU 114 sends to the driver a message such as "a new road may be constructed, is the map to be updated?" by voice or on the display and waits the input indicating whether the map updating is requested or not.

It can also be considered that the occupant of the vehicle causes the request to be written on request storing unit 134 even without the above-described inquiry. For example, it is only required that, when the occupant feels it necessary to obtain the detailed map of the area where the occupant frequently visits, it can be added to request storing unit 134 that the detailed map is requested while running in the area. In addition, for example, when a favorite music is played on the radio, the radio station and the date and time on which the music is played may be recorded to refer to the database of the radio station during the charging to specify the music and send a request for the music data to the music distribution server.

When the above-described request is established, the contents are downloaded in charging device 200 before, in parallel with, or after the charging. Main control ECU 208 sends a request for the contents to external server 300 via a transmission and reception unit 232 to receive the contents from server 300. A temporary storage unit 234 temporarily storing the received contents may be provided. Main control ECU 208 transmits the received contents to the vehicle 100 side through electric power line communication unit 210. On the vehicle side, main control ECU 114 receives the contents through electric power line communication unit 116 to write them on contents storing unit 136.

Figure 3:
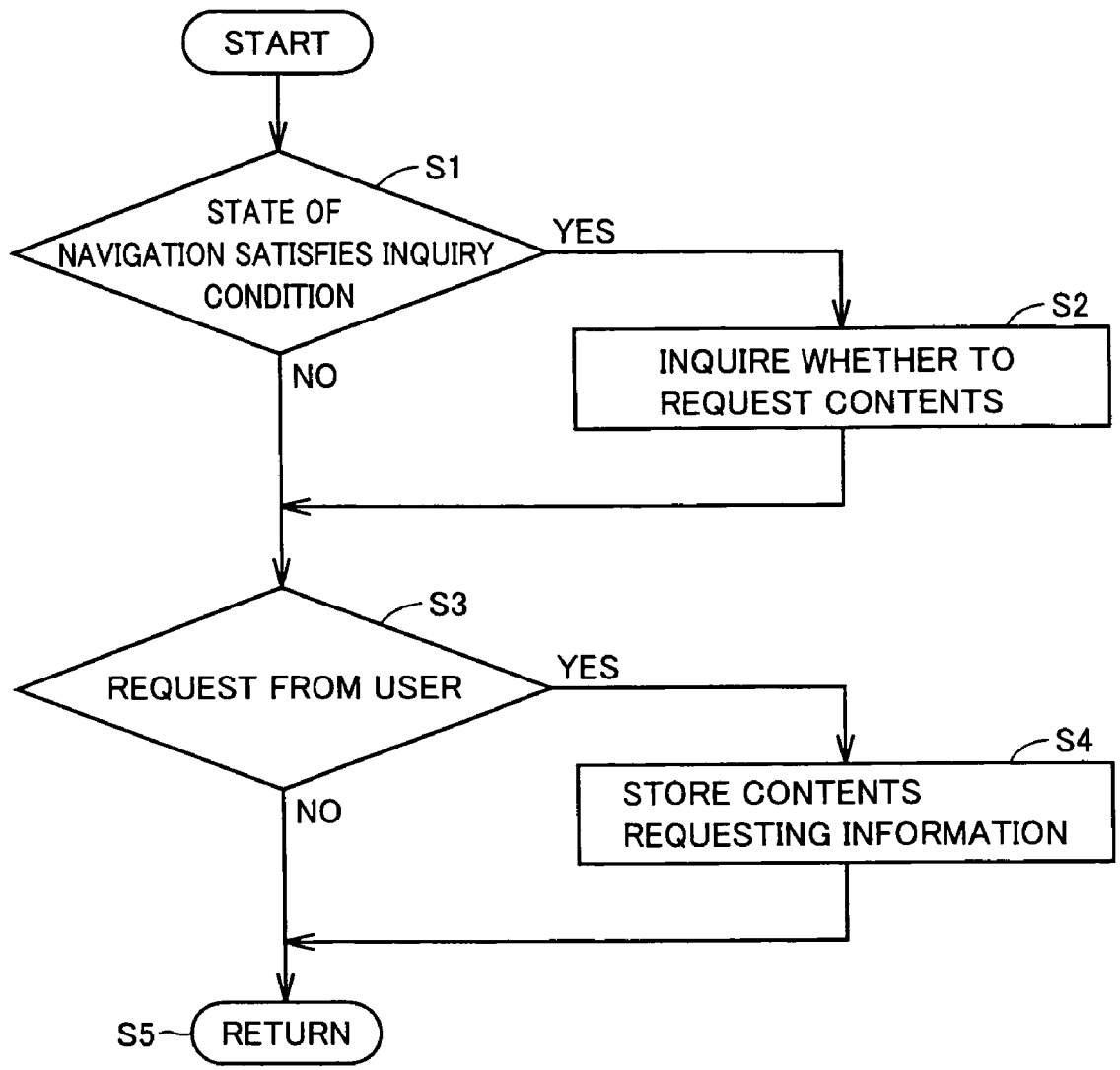
FIG. 3 is a flowchart of a processing structure of a program relating to the storage of contents requesting information executed in the vehicle.

FIG. 3 is a flowchart of a processing structure of a program relating to the storage of the contents requesting information executed in the vehicle. The process of this flowchart is called for execution from the main routine performed in the state where the vehicle can run at regular time intervals or every time the predetermined conditions are satisfied.

Referring to FIGS. 2 and 3, when the process is first started, in step S1, main control ECU 114 determines whether the state of car navigation system 132 satisfies the predetermined condition.

For example, during the vehicle running in the state where the surrounding map and the vehicle location are displayed on the display by the car navigation system, the vehicle may be shown on the display as if it runs in the area with no road. In this case, there is a possibility that a newly constructed road is not shown on the map. Furthermore, in the case where the display shows that the vehicle runs at a speed far exceeding the speed limit in an urban area, a new expressway may be constructed in that area.

This is the case where the state of car navigation system 132 satisfies the predetermined condition.

In step S1, if it is determined that the state of car navigation system 132 satisfies the predetermined condition, the process goes to step S2.

In step S2, the occupant of the vehicle is inquired whether the contents are requested or not. For example, main control ECU 114 sends to the driver a message such as "a new road may be constructed, is the map to be updated?" by voice or on the display and waits the input indicating whether the map updating is requested or not. The process then goes to step S3.

If it is determined in step S1 that the state of car navigation system 132 does not satisfy the predetermined condition, the process goes to step S3.

In the case where the process goes from step S2 to step S3, when the instruction to request the contents is received from the occupant, the process goes to step S4 and the contents requesting information is added to request storing unit 134.

Furthermore, in step S3, the occupant of the vehicle can also cause the request to be written on request storing unit 134 even without such an inquiry. For example, it is only required that, when the occupant feels it necessary to obtain the detailed map of the area where the occupant frequently visits, the request from the user that the detailed map is requested while running in the area can be input. More specifically, the driver indicates by a request button that the driver wants to update the map of a certain area (wants to obtain the information about the store and the like around the area).

Also in this case, the process goes to step S4, where the content of the request is added to request storing unit 134. In addition, for example, when a favorite music is played on the radio, the radio station and the date and time on which the music is played may be recorded for use as the contents requesting information.

If there is no request from the user in step S3 and the process of step S4 is completed, the process goes to step S5 and the control is passed to the main routine.

FIG. 4 is a flowchart of a processing structure of a program relating to the download of the contents executed during charging.

Referring to FIGS. 2 and 4, as the process is first started, in step S11, it is determined whether connector 206 is connected to connector 124 and whether there is a charging instruction from a charging operator. Main control ECU 114 determines based on the output of connector connection detecting unit 120 as to whether the connectors are connected or not. Furthermore, main control ECU 114 receives the instruction from input device 212 through main control ECU 208, electric power line communication unit 210, charging cable 218, and electric power line communication unit 116 to make a determination as to the charging instruction from the charging operator.

In the case where the connectors are not connected to each other or there is no charging instruction in step S11, the process is completed in step S21. In the case where the connectors are connected to each other and there is a charging instruction in step S11, the process goes to step S12.

In step S12, prior to receiving the contents, main control ECU 114 notifies of the content of the contents requesting information to inquire of the operator performing the charging whether it is intended to receive the contents based on the contents requesting information. Main control ECU 114, in cooperation with main control ECU 208 on the charging device side, displays the content of the contents requesting information stored in request storing unit 134 on display device 214 to confirm whether or not the displayed contents are downloaded from the server. The operator performing the charging inputs permission or inhibition of the reception of the contents into input device 212.

In step S13, it is determined based on the input result whether or not the download of the contents is permitted by the driver or the charging operator. If the download is permitted in step S13, main control ECU 208 sends a request for the contents to server 300 of the external distribution center through transmission and reception unit 232 in step S15.

In step S16, main control ECU 208 then receives the contents from server 300. The received contents may be temporarily stored in temporary storage unit 234. Main control ECU 208 transmits the received contents to the vehicle 100 side through electric power line communication unit 210. On the vehicle side, main control ECU 114 receives the contents through electric power line communication unit 116 to write them on contents storing unit 136 and completes the reception. When the reception of the contents is completed, the process goes from step S16 to step S17.

On the other hand, in the case where the process goes from step S13 to step S14, the charging operator is further inquired whether the contents requesting information is deleted or not. When input device 212 inputs the instruction to delete the contents requesting information, main control ECU 114 deletes the contents requesting information stored in request storing unit 134. For example, the contents requesting information was recorded on request storing unit 134 because the information seemed necessary during the vehicle running. However, if such information becomes unnecessary at the time of the charging at home, the contents requesting information is to be deleted.

Furthermore, when the reception of the contents is completed and the process goes from step S16 to step S17, the contents requesting information is not required any more. Thus, the contents requesting information stored in request storing unit 134 is deleted.

When the deletion of the contents requesting information in step S17 is completed, the process goes to step S18.

Although the contents presented by the contents requesting information is not downloaded at this time, for example, in consideration of the cost, it is also conceivable that the contents requesting information is desired to be remained in request storing unit 134 in order to allow for a future download. In this case, the process goes from step S14 to step S18.

In step S18, main control ECU 114 requests charging device 200 through electric power line communication unit 116 to feed electric power. Main control ECU 114 then controls switch 122 to be closed and operates charging AC/DC conversion unit 110 to convert the AC power received from the outside into a DC power for the charging operation of main battery 102.

During charging, control ECU 114 determines in step S19 whether the state of charge of main battery 102 is smaller than a predetermined threshold value SOC1. If state of charge SOC is smaller than threshold value SOC1, it is determined that the charging needs to be continued and the process returns to step S18 to continue the charging.

In the case where state of charge SOC is not less than predetermined threshold value SOC1 in step S19, the process goes to step S20. In step S20, main control ECU 114 stops charging AC/DC conversion unit 110 to cause switch 122 to be opened, and requests charging device 200 through electric power line communication unit 116 to stop the electric power feeding, to thereby stop the charging. When the process of step S20 is finished, the charging is completed in step S21. Note that the process of receiving the contents in step S16 may be performed in parallel with the charging process in steps S18 and S19.

As described above, in the present embodiment, the information of the contents desired to be requested can be collected for record in the state where the vehicle is located away from the charging device. This allows the contents that seemed necessary to be requested without fail. Furthermore, the charging operator does not need to input the required contents as textual information during the charging operation, which can prevent the charging operation from being complicated.

Furthermore, if the download of the contents is performed in parallel with the charging, it is less likely to cause an interruption of the download due to a dead battery as in the data communication using the wireless device.

In the present embodiment, the example in which the communication and the transmission of the contents between the charging device and vehicle 100 are performed by the electric power line communication has been described, which may be, however, performed using the communication-dedicated line integrated into the cable in parallel with the electric power line. Even in this case, if the connector is structured such that both of the electric power line and the communication line are in the connected states when a plug is connected for charging, the operation of the charging operator can be prevented from being complicated.

[Modification]

The case where the contents are navigation information, music, and the like has been described in the above. In addition to this, it is also conceivable that the contents are the program executed by a vehicle ECU, the data to be referred, and the like.

In the case where the sensor (for example, an air-fuel ratio sensor provided in the vicinity of the exhaust gas purification catalyst, a current sensor for motor control, voltage and current sensors within the battery monitoring unit, and the like) incorporated in the vehicle indicates abnormality, the vehicle ECU detects the abnormality during running to perform failure diagnosis. The history of the output of these sensors and the history of the failure diagnosis are stored as "information-related data" in the first storage unit.

When the vehicle is connected to an external device for charging and the like, the information such as a program solving problems resulting from failure, a map, and the like is stored in the second storage unit, and is executed and referred by the vehicle ECU. Note that the determination may be made by the ECU inside the vehicle as to whether new information is read into the second storage unit based on the "information-related data", but may be made outside the vehicle based on the "information-related data", which is sent to the external device, suggesting the need for new information.

In the present embodiment, FIG. 2 shows, as an example of a rechargeable vehicle, an electric vehicle in which the motor drives the wheels. However, the present invention may be applied to a series/parallel type hybrid vehicle in which the power of the engine can be divided by the power split device for transmission into the axle and the power generator, and also to a series type hybrid vehicle in which the driving force of the axle is generated only by the motor using the electric power generated by the power generator. The battery may be charged from the outside in these configurations to which the present invention is applicable.

In the above-described embodiments, the configuration in which the electric device external to the vehicle corresponds to a charging device which includes an AC power supply has been described as an example, which may also be a configuration in which the charging device has a DC power supply. In this case, for example in FIG. 2, AC power supply 202 is replaced with a DC power supply and charging AC/DC conversion unit 110 is replaced with a DC/DC conversion unit.

Furthermore, the electric device external to the vehicle may receive electric power from the vehicle. In this case, for example, charging AC/DC conversion unit 110 in FIG. 2 is replaced with an AC/DC conversion unit converting the DC power received from the battery and the on-vehicle power generator into an AC power for supply to the outside. In addition, for example, in the case where the DC power is supplied to the outside, charging AC/DC conversion unit 110 in FIG. 2 is replaced with a DC/DC conversion unit receiving the DC power from the battery and the on-vehicle power generator to perform voltage conversion for supply to the outside. In particular, the hybrid vehicle can be used as a power supply device in case of emergency.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A vehicle having an apparatus using contents and having an electric power transmitting and receiving device transmitting and receiving electric power to and from an external device external to the vehicle, comprising:
 a first storage unit storing contents requesting information for said contents used in said apparatus;
 a second storage unit storing said contents;
 a detecting unit detecting a connected state of said vehicle to said external device; and
 a control unit, when receiving an instruction from an occupant to request new one of said contents in a state where said external device and said vehicle are not connected to each other, writing corresponding one of said contents requesting information to said first storage unit, and, when said detecting unit detects the connected state, obtaining said contents to store in said second storage unit from outside the vehicle based on said contents requesting information stored in said first storage unit,
 said control unit notifying of a content of said contents requesting information prior to receiving said contents to inquire of an operator connecting said vehicle and said external device whether said contents are intended to be received based on said contents requesting information, and
 said control unit receiving said contents when a result of said inquiry indicates permission of reception of said contents, and further inquiring whether said contents requesting information is to be deleted when the result of said inquiry indicates inhibition of reception of said contents.

2. The vehicle according to claim 1, wherein
 said vehicle and said external device are connected by a cable for transmitting and receiving electric power, and
 said contents are stored in said second storage unit through said cable.

3. The vehicle according to claim 2, wherein said contents requesting information is transmitted through said cable.

4. A vehicle having an apparatus using contents and having an electric power transmitting and receiving device transmitting and receiving electric power to and from an external device external to the vehicle, comprising:
 a first storage unit storing contents requesting information for said contents used in said apparatus;
 a second storage unit storing said contents;
 a detecting unit detecting a connected state of said vehicle to said external device;
 a control unit, when receiving an instruction from an occupant to request new one of said contents in a state where said external device and said vehicle are not connected to each other, writing corresponding one of said contents requesting information to said first storage unit, and, when said detecting unit detects the connected state, obtaining said contents to store in said second storage unit from outside the vehicle based on said contents requesting information stored in said first storage unit; and
 a car navigation device,
 said control unit, when a state of said car navigation device satisfies a predetermined condition, inquiring of said occupant of said vehicle whether to obtain said contents, and, when receiving an instruction from said occupant to obtain said contents, adding a request for said contents as said contents requesting information to said first storage unit.

5. The vehicle according to claim 4, wherein
 said vehicle and said external device are connected by a cable for transmitting and receiving electric power, and
 said contents are stored in said second storage unit through said cable.

6. The vehicle according to claim 5, wherein said contents requesting information is transmitted through said cable.

7. An information apparatus of a vehicle using contents and mounted in the vehicle having an electric power transmitting and receiving device transmitting and receiving electric power to and from an external device external to the vehicle, comprising:
 a first storage unit storing contents requesting information for said contents used in said information apparatus;
 a second storage unit storing said contents;
 a detecting unit detecting a connected state of said vehicle to said external device; and
 a control unit, when receiving an instruction from an occupant to request new one of said contents in a state where said external device and said vehicle are not connected to each other, writing corresponding one of said contents requesting information to said first storage unit, and, when said detecting unit detects the connected state, obtaining said contents to store in said second storage unit from outside the vehicle based on said contents requesting information stored in said first storage unit, said control unit notifying of a content of said contents requesting information prior to receiving said contents to inquire of an operator connecting said vehicle and said external device whether said contents are intended to be received based on said contents requesting information, and said control unit receiving said contents when a result of said inquiry indicates permission of reception of said contents, and further inquiring whether said contents requesting information is to be deleted when the result of said inquiry indicates inhibition of reception of said contents.

8. The information apparatus of the vehicle according to claim 7, wherein said vehicle and said external device are connected by a cable for transmitting and receiving electric power, and said contents are stored in said second storage unit through said cable.

9. The information apparatus of the vehicle according to claim 8, wherein said contents requesting information is transmitted through said cable.

10. An information apparatus of a vehicle using contents and mounted in the vehicle having an electric power transmitting and receiving device transmitting and receiving electric power to and from an external device external to the vehicle, comprising:

a first storage unit storing contents requesting information for said contents used in said information apparatus;

a second storage unit storing said contents;

a detecting unit detecting a connected state of said vehicle to said external device;

a control unit, when receiving an instruction from an occupant to request new one of said contents in a state where said external device and said vehicle are not connected to each other, writing corresponding one of said contents requesting information to said first storage unit, and, when said detecting unit detects the connected state, obtaining said contents to store in said second storage unit from outside the vehicle based on said contents requesting information stored in said first storage unit; and a car navigation device, said control unit, when a state of said car navigation device satisfies a predetermined condition, inquiring of said occupant of said vehicle whether to obtain said contents, and, when receiving an instruction from said occupant to obtain said contents, adding a request for said contents as said contents requesting information to said first storage unit.

11. The information apparatus of the vehicle according to claim 10, wherein said vehicle and said external device are connected by a cable for transmitting and receiving electric power, and said contents are stored in said second storage unit through said cable.

12. The information apparatus of the vehicle according to claim 11, wherein said contents requesting information is transmitted through said cable.

\* \* \* \* \*